United States Patent
Opyrchal

[11] 3,957,144
[45] May 18, 1976

[54] CONTINUOUS ROLLER BRAKE

[75] Inventor: Martin A. Opyrchal, Charlotte, N.C.

[73] Assignee: Duff-Norton Company, Inc., Charlotte, N.C.

[22] Filed: Sept. 30, 1974

[21] Appl. No.: 510,506

Related U.S. Application Data

[62] Division of Ser. No. 397,012, Sept. 13, 1973, Pat. No. 3,873,066.

[52] U.S. Cl. .............................. 192/8 R; 308/184 R; 188/83
[51] Int. Cl.² ......................................... F16D 63/00
[58] Field of Search................... 188/83, 82.84, 84; 308/184 R, 184 A; 192/30 R, 8 R

[56] References Cited
UNITED STATES PATENTS

| | | | |
|---|---|---|---|
| 1,162,125 | 11/1915 | Bassett | 188/1 B |
| 1,228,673 | 6/1917 | Hribar | 188/82.84 |
| 2,178,740 | 11/1939 | Dennis et al. | 188/82.84 X |

Primary Examiner—Benjamin W. Wyche
Attorney, Agent, or Firm—Richards, Shefte & Pinckney

[57] ABSTRACT

A self-contained mechanical actuator, such as a jackscrew, which includes a housing in which a drive shaft assembly connects a power source to the input side of a speed reduction gear train, the output of which is associated with load-bearing means for manipulation of a load. A brake is provided in association with the drive shaft assembly where a minimum braking force can be used to maximum advantage. The brake includes a carrier member mounted about the drive shaft assembly solely by a plurality of ball elements carried by the carrier member and biased against the drive shaft assembly to apply a braking force against the shaft. The carrier member is restrained against rotational movement about the drive shaft assembly by engagement with an abutment rib in the housing, and against axial movement along the drive shaft assembly by ball element engagement in a circumferential groove formed in the shaft, with the carrier member being otherwise free for radial and axial movement to allow self-alignment of the ball elements in the groove for even braking action of the ball elements.

4 Claims, 7 Drawing Figures

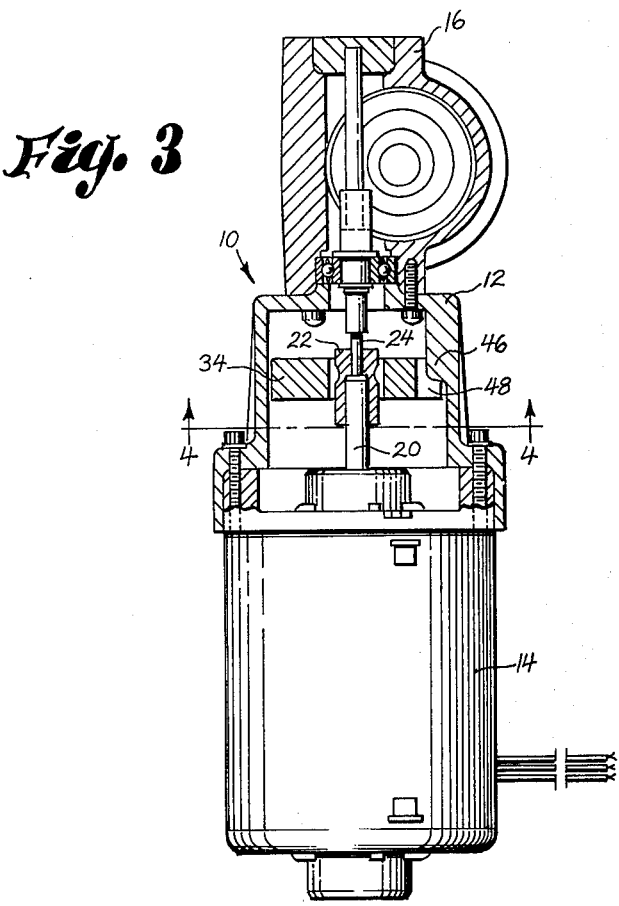
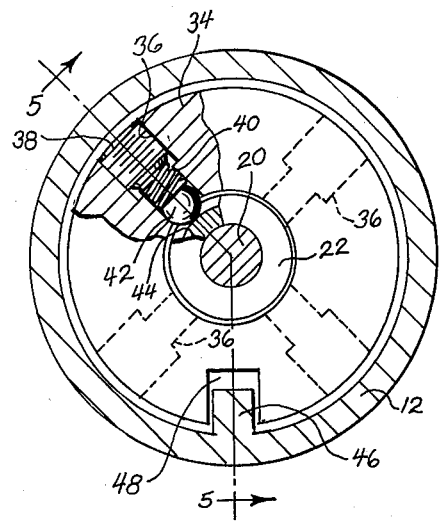
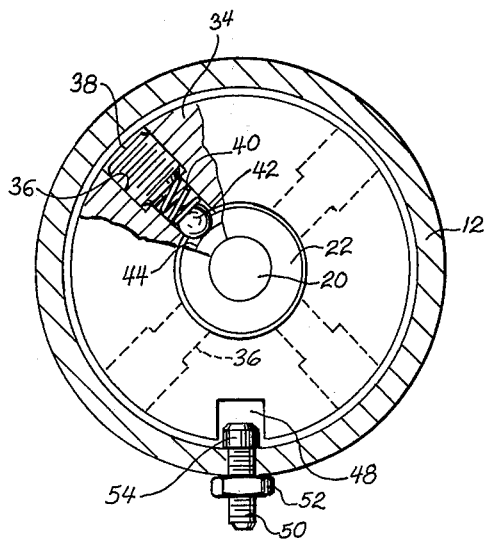
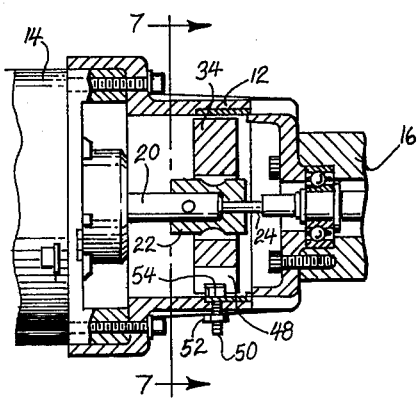

CONTINUOUS ROLLER BRAKE

CROSS-REFERENCE TO RELATED APPLICATIONS

This application is a division of parent application Ser. No. 397,012, filed Sept. 13, 1973 and now U.S. Pat. No. 3,873,066.

BACKGROUND OF THE INVENTION

Self-contained mechanical actuators, either of the jackscrew or hoist type, commonly include a drive motor, a drive shaft extending therefrom to a connection at the input side of a speed reduction gear train (e.g. 20:1 reduction ratio), and a load-bearing arrangement which is operated by the output side of the speed reduction gear train. Typical disclosures of such a self-contained mechanical actuator are presented in U.S. Pat. No. 3,559,499 and U.S. Pat. No. 3,587,796, the actuator described in these patents also including a self-locking transmission mechanism which acts to transmit rotation of the drive shaft to the gear reduction train and to provide a self-locking drag which is imposed on the drive shaft to stop rotation thereof when power from the drive motor is terminated, thereby acting as a brake. While such a self-locking transmission is satisfactory in operation, it generates noise which may be objectional, and it has a tendency to allow a slight amount of reverse drift of the loadbearing member before complete braking is obtained.

It has been proposed heretofore in U.S. Pat. No. 3,651,906 to employ a fixed housing having ball elements contained therein and biased against a clutch element to prevent temporarily any rotational movement of the clutch element upon startup of drive shaft rotation. However, because the ball element housing is fixed, a problem may be encountered in properly aligning the housing so that an even distribution of ball element pressure can be obtained. Moreover, and perhaps because of this potential uneven pressure distribution, the clutch element surface upon which the ball elements act has flat edges which act to increase the pressure of the ball element on the clutch element, such flat edges also acting to cause constant reciprocation of the ball elements in their respective slots whereby significant wear is encountered as well as a high noise level.

It has also been heretofore proposed in U.S. Pat. No. 3,096,453 to utilize biased ball elements in a driven shaft telescopically received in a drive shaft, the ball elements acting as a point contact frictional drive for the two shafts as well as a frictional drag on the drive shaft when the driven shaft is mechanically braked. However, this arrangement requires a relatively precise alignment of the two telescopically arranged shafts and a mechanical brake must be provided for the purpose of stopping the rotation of one of the shafts.

In substantial contrast, the mechanical actuator of the present invention includes a brake arrangement which is very simple and reliable, and which is self-aligning and easily mounted in place to impose the necessary braking force even on a high-speed drive shaft.

SUMMARY OF THE INVENTION

The present invention is directed to a mechanical actuator, generally of the jackscrew or hoist type, which includes a high speed motor that is connected through a drive shaft assembly to the input side of a reduction gear train which has its output side connected to a load-bearing member for manipulating a load, the reduction gear train acting to convert the high speed motor rotation into a high load capacity movement for the load-bearing member. The mechanical actuator includes a braking arrangement that is associated with the drive shaft assembly to stop further rotation thereof when the motor is de-energized whereby further movement of the load bearing member is likewise stopped. This braking arrangement includes a carrier member mounted on the drive shaft assembly by a plurality of radially spaced ball elements carried in the carrier member with means biasing the ball elements into contact with the drive shaft assembly and with the ball elements constituting the sole means of support for the carrier member. Stationary abutment means is disposed on the housing for engagement with the carrier member to restrict rotational movement thereof and thereby cause the ball elements to apply a braking resistance to rotation of the drive shaft assembly.

Preferably, the stationary abutment means extends from the housing of the mechanical actuator, either as an integral rib or as a selectively detachable bolt mounted in the housing, and the carrier member is formed with a slot that is larger than the abutment means whereby the abutment member is loosely received in the slot to allow relative movement.

In the preferred embodiment of the present invention, the drive shaft assembly includes a drive shaft extending from the drive motor, and a detachable coupling by which such drive is connected to the input shaft of the aforementioned reduction gear train, and the outer surface of the coupling is formed with a circumferential groove which is engaged by the ball elements in the carrier member. This groove acts to increase the area of contact between the coupling and the ball elements and improve the braking effect of the ball members, and such groove additionally provides a means by which the carrier member is self-aligned on the coupling and is retained against axial movement therealong. Because, as described above, the carrier member is mounted solely by the ball elements about the drive shaft assembly, and its disposition is not fixed with respect thereto, the carrier member does not inhibit the ball elements from properly aligning themselves axially and radially in the groove with an equal distribution of braking pressure being applied at the groove by each of the biased ball elements. Moreover, once the ball elements have aligned themselves in the groove, they will remain in the groove and prevent movement of the carrier member axially along the drive shaft assembly.

The carrier member of the present invention preferably includes a plurality of radial bores extending therethrough with the bores being equally spaced circumferentially from one another and each bore threadably receiving an adjustable screw element at the radially outermost portion thereof, a ball element at the radially innermost portion thereof, and an intermediate spring element acting between the screw element and the ball element in each bore to urge the ball element radially inwardly against the drive shaft assembly. By adjusting the radial position of the screw element in each bore, the bias exerted against the ball element associated therewith can be selectively varied to adjust the braking force of the ball element against the driv shaft assembly.

BRIEF DESCRIPTION OF THE DRAWINGS

FIG. 3 is a plan view, partly broken away, illustrating the location of the brake in the mechanical actuator shown in FIG. 1;

FIG. 4 is a detailed sectional view taken along line 4—4 in FIG. 3;

FIG. 6 is a view generally similar to FIG. 3, illustrating an alternative embodiment of the mechanical actuator of the present invention; and FIG. 7 is a sectional view, partly broken away, taken along line 7—7 in FIG. 6.

DESCRIPTION OF THE PREFERRED EMBODIMENTS

Figure 2:
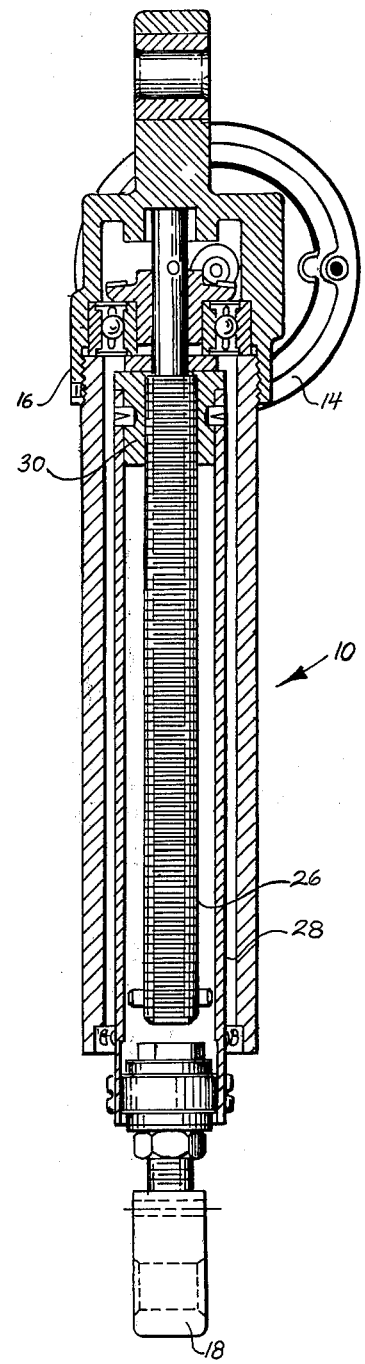
FIG. 2 is a vertical sectional view taken centrally through the reduction gear train, screw, nut and load-bearing member of the mechanical actuator shown in FIG. 1.

Referring in detail to the accompanying drawings, the mechanical actuator 10 of the present invention includes a housing 12 having secured to one side thereof an electric drive motor 14 and at the other side thereof a speed reduction gear unit 16 from which extends a load-bearing member 18, all of which is substantially similar to the mechanical actuator illustrated and described in the aforementioned U.S. Pat. Nos. 3,559,499 and 3,587,796, except for the novel braking arrangement of the present invention to be described presently. As indicated in greater detail in the aforementioned patents, the electric drive motor 14 may be a small horsepower, high speed motor, and it includes a drive shaft 20 extending therefrom. The drive shaft 20 has attached thereto a selectively removable cylindrical coupling element 22 located within the housing, the coupling 22 also being attached to a driven shaft 24 axially aligned with the drive shaft 20 at the input side of the speed reduction gear unit 16, with the drive shaft 20, coupling 22 and driven shaft 24 constituting the previously referred to drive shaft assembly. The various gear sets in the speed reduction gear unit 16 are identical to the corresponding gear sets described in detail in the aforementioned U.S. Pat. Nos. 3,559,499 and 3,587,796, and, since the details of these gear sets are not part of the present invention, reference is hereby made to such patents for a full description thereof. It is sufficient, for purposes of the present invention, to understand that the reduction gear unit 16 transmits the input rotation of the drive shaft 20 to an output screw member 26 (see FIG. 2) at a significant reduction ratio, and the rotation of the output screw member 26 is translated into linear movement by a translating tube 28 through a traveling nut member 30 interconnecting the output screw member 26 and the translating tube 28. The lower or extending end of the translating tube 28 has the load-bearing member 18 attached thereto for attachment to and manipulation of a load.

In a typical commercial embodiment, the drive motor 14 is a 1/10 horsepower, permanent magnet, direct current motor having a drive shaft speed of 2,400 r.p.m., and the reduction gear unit 16 operates at a reduction ratio of 20:1 whereby the output screw 26 rotates at 120 r.p.m., this commercial embodiment being particularly useful in manipulating garden tractor accessories, raising and lowering dental chairs, positioning X-ray equipment and various other uses.

In most applications of the mechanical actuator 10, it is important operationally to provide for proper braking of the movement of the load-bearing member 18 upon de-energization of the drive motor 14 so that the load-bearing member 18 and the load attached thereto can be accurately positioned by selective energization and de-energization of the drive motor 14, and to provide for holding of the load in place without drift after the desired movement of the load has taken place. If the drive motor 14 is of the permanent magnet, direct current type, there will be an inherent braking of the drive shaft 20 when the drive motor 14 is de-energized, but the load, which may be up to 500 pounds in the aforementioned typical commercial embodiment, may be transmitted through the gear reduction unit 16 and overcome the braking effect of the drive motor 14 on the drive shaft 20 unless a supplemental braking force is applied.

Figure 1:
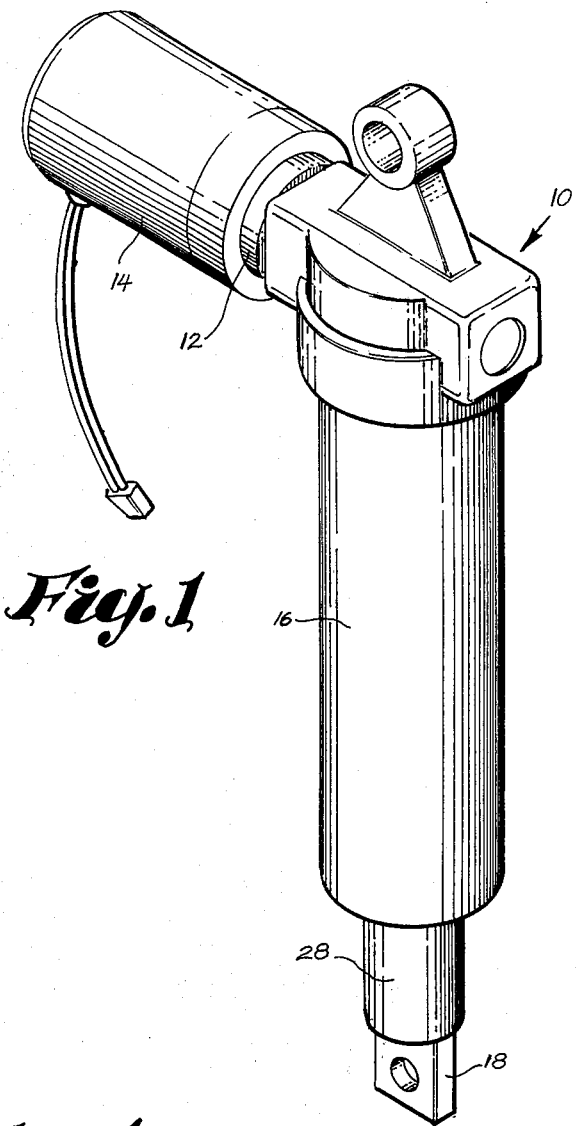
FIG. 1 is a perspective view of a mechanical actuator according to the preferred embodiment of the present invention.
Figure 5:
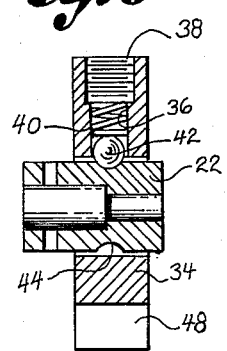
FIG. 5 is a detailed sectional view of the carrier member and shaft of the mechanical actuator of FIG. 1, taken along line 5—5 in FIG. 4.

In accordance with the present invention, the desired braking force is obtained from a "floating" brake disposed within the housing 12 and acting to brake the drive shaft 20. As best seen in FIGS. 3-5, the brake includes an annular carrier member 34 surrounding the shaft coupling element 22 and having a plurality, preferably four, of bores 36 extending radially therethrough, the bores 36 being equally spaced circumferentially from one another. Each bore 36 is counterbored and threaded at the radially outermost portion thereof to threadably receive an adjustment screw 38 which is in abutment with one end of a compression spring 40 that abuts at its other end a ball element 42 located at the radially innermost portion of the bore 36, the compression spring 40 acting between the adjustment screw 38 and the ball element 42 to urge the latter into contact with a circumferential groove 44 formed in the outer surface of the coupling element 22. The ball elements 42 are preferably formed of nylon so as to be quiet in operation and to have a long service life.

It is to be particularly noted that the carrier member 34 is not fixed or otherwise secured to the housing 12, and that the ball elements 42 constitute the sole support for the carrier member 34. Because of the purchase of the ball elements 42 within the groove 44, the carrier member 34 would tend to rotate with the drive shaft 24 unless otherwise restrained, and in the embodiment of the present invention shown in FIGS. 1-5, such restraint is obtained by a stationary abutment rib 46 formed integrally with the housing 12 to extend inwardly toward the drive shaft 20, such abutment rib 46 being received in a radial slot 48 formed in the carrier member 34 as best seen in FIG. 5. The dimensions of the slot 48 are somewhat greater than the dimensions of that portion of the abutment rib 46 received in the slot 48 so that the slot 48 only loosely receives the abutment rib 46. Thus, the abutment rib 46 is disposed within the rotational path of the carrier member 34 for engagement therewith to restrict the rotational movement thereof and thereby cause the ball elements 42 to apply a braking resistance to rotation of the drive shaft 20, yet the carrier member 34 has a certain freedom of axial and radial movement because of the loose relationship between the abutment rib 46 and the slot 48.

The loose relationship has several significant advantages. First, it is quite easy to mount the carrier member 34 about the drive shaft coupling element 22, or to replace a worn or defective carrier member 34, because it is not mechanically attached to the housing 12. More importantly, the latitude of movement permitted by such loose relationship allows the carrier member 34 and the ball elements 42 to be totally self-aligning in that the ball elements 42 can and will align themselves evenly both radially and axially with respect to the groove 44 and the carrier member 34 can shift sufficiently to accommodate a range of positions determined by the relationship of the ball elements 42 and the coupling element 22. For example, if the groove 44 does not lie exactly in a plane radial to the drive shaft 20 or if the drive shaft 20 has a slight longitudinal eccentricity therein, the ball elements 42 will nevertheless align themselves properly in the groove 44 and the carrier member 34 may cant slightly to permit such proper alignment of the ball elements 42. Moreover, since the carrier member 34 is not fixed, a greater or lesser degree of bias imposed on one or more of the individual ball elements 42 can be accommodated by a self-aligning shift of the carrier member 34 to permit the ball elements 42 to assume proper positions in their respective bores 36 so as to equalize the radial urging of the spring pressure against each of the ball elements 42.

It is to be noted that the groove 44 is not absolutely essential to the operation of the present invention because the biased ball elements 42 could bear directly against a smooth outer surface of the drive shaft 20 or the shaft coupling element 22 or the driven shaft 24, and the carrier member 34 could be allowed to move freely along the drive shaft 20 if the abutment rib 46 were extended so as to be continuously received by the slot 48 regardless of the axial position of the carrier member 34. However, it is preferable to have the biased ball elements 42 engage a groove 44 rather than have point contact with the outer surface of the coupling element 22 because of the increased braking purchase which the biased ball members 42 can exert by groove engagement. Additionally, and in accordance with a further feature of the present invention, the groove 42 concentrates the wear resulting from the constant engagement thereof with the ball elements 42, and this groove 42 is formed in the selectively removable shaft coupling element 22, which is preferably formed of steel because of its ability to withstand wear, rather than the generally fixed drive shaft 20 or driven shaft 24 whereby excessive wear of the groove 44 requires only the relatively simple replacement of the shaft coupling element 22 rather than the more difficult replacement of either the drive shaft 20 or driven shaft 24.

The location of the carrier member 34 on the shaft coupling member 22, and therefore at the input side of the reduction gear unit 16, is significant because less resistance is required at this location to obtain satisfactory braking results. The braking applied by the biased ball elements 42 is applied, in effect, directly to the drive shaft 20 of the drive motor 14, and the adjustment screws 38 can be selectively positioned to provide a sufficient static braking force to the drive shaft 20 when the drive motor 14 is not energized to hold the shaft against rotation. This static braking force can, however, be overcome by using an electric drive motor having a high starting torque applied to the drive shaft 20 when initially energized, and, after the static braking force has been overcome, the lesser rolling friction imposed by the ball elements 42 is not sufficient to appreciably affect the operation of the mechanical actuator in an adverse way. If the drive motor 14 is an A.C. electric motor, there will be no appreciable reduction in the running speed of the drive shaft 20, and if a D.C. motor is used, there will be a slight but acceptable reduction in the running speed of the drive shaft 20. In any event, the static friction imposed on the drive shaft 20 by the biased balls can be adjusted within limits to effectively brake the drive shaft 20 when the drive motor 14 is de-energized even if a substantial load is imposed on the load-bearing member 18, and the reduced brake force imposed on the drive shaft 20 when it is running is sufficient, together with any inherent braking force applied by the drive motor 14 itself upon de-energization thereof, to brake the drive shaft 20 within acceptable limits upon such de-energization, whereupon the static friction imposed on the drive shaft 20 will hold it against rotation and hold the load in place, all without any drift of the load. In the typical commercial embodiment of the present invention described previously it has been found that optimum braking results are obtained if the adjustment screws 38 are positioned to have the ball members impose a static braking force of about 28 inch-ounces on the drive shaft 20.

An alternate embodiment of the present invention is illustrated in FIGS. 6 and 7, and to the extent that the elements in this embodiment are the same as the embodiment shown in FIGS. 1–5, the same reference numerals have been used. The embodiment shown in FIGS. 6 and 7 differs from that shown in FIGS. 1–5 in that instead of forming the housing 16 with an integrally formed rib, a bolt element 50 having a nut 52 associated therewith is mounted in the wall of the housing 12 and is selectively removable therefrom. The head 54 of the bolt element 50 is disposed at the inner wall of the housing 12 and projects inwardly therefrom to be loosely received in the slot 48 in the carrier member 34 to restrict rotational movement thereof in the same manner as the abutment rib 46 in the embodiment shown in FIGS. 1–5. However, since the bolt element 50 is selectively removable, it can be readily replaced if worn or defective, and bolt elements having different size heads can be used, if desired, to vary the amount of rotational shifting or "play" which the carrier member 34 will have.

The present invention has been described in detail above for purposes of illustration only and is not intended to be limited by this description or otherwise to exclude any variation or equivalent arrangement that would be apparent from, or reasonably suggested by, the foregoing disclosure to the skill of the art.

I claim:

1. A self-aligning brake for use with a rotating shaft means having a circumferential groove formed therein, said brake comprising a carrier member mounted on said shaft means, a plurality of ball elements carried in said carrier member and circumferentially spaced around said shaft means, biasing means for each of said ball elements biasing each of said ball elements radially inwardly into contact with said shaft means at said circumferential groove therein, said ball elements constituting the sole support for said carrier member, and stationary abutment means disposed for engagement with said carrier member to restrict the rotational movement thereof and thereby cause said ball elements to apply a braking resistance to rotation of said shaft means in either rotational direction.

2. A self-aligning brake as defined in claim 1 and further characterized in that said carrier member is formed with a slot for receiving said abutment means, the dimensions of said slot being greater than the dimensions of the portion of said abutment means located therein to loosely receive the same and permit axial movement of said carrier member thereby allowing the ball elements to align themselves and said carrier member evenly with said groove.

3. A self-aligning brake as defined in claim 1 and further characterized in that said shaft means includes a drive shaft member and a selectively removable coupling element attached thereto, and in that said circumferential groove is formed in the exterior surface of said coupling element.

4. A self-aligning brake as defined in claim 1 and further characterized in that said carrier member includes a plurality of radial bores extending therethrough, said bores being equally spaced circumferentially from one another with each bore threadably receiving at the radially outermost portion thereof an adjustable screw element, and in that one of said ball elements in disposed in each said bore at the radially innermost portion thereof with a biasing spring element acting between said screw element and said ball element to urge said ball element radially inwardly into contact with said circumferential groove of said shaft means, the position of said screw member in each said bore being adjustable to vary the bias imposed on the ball element associated therewith when said ball element is in engagement with said circumferential groove in said shaft means.

* * * * *